United States Patent [19]

Reeder et al.

[11] Patent Number: 5,071,473

[45] Date of Patent: Dec. 10, 1991

[54] UNIFORM COARSE TUNGSTEN CARBIDE POWDER AND CEMENTED TUNGSTEN CARBIDE ARTICLE AND PROCESS FOR PRODUCING SAME

[75] Inventors: David A. Reeder, Sayre; Carlos Lopez; Jack L. Burwick, both of Towanda, all of Pa.

[73] Assignee: GTE Products Corporation, Stamford, Conn.

[21] Appl. No.: 509,388

[22] Filed: Apr. 16, 1990

Related U.S. Application Data

[63] Continuation of Ser. No. 308,507, Feb. 10, 1989.

[51] Int. Cl.$^5$ .............................................. C22C 29/08
[52] U.S. Cl. ........................................ 75/240; 419/18; 419/23
[58] Field of Search ........................ 75/240; 419/18, 23

[56] References Cited

U.S. PATENT DOCUMENTS

| | | | |
|---|---|---|---|
| 4,070,184 | 1/1978 | Scheithauer, Jr. et al. | 75/203 |
| 4,579,587 | 4/1986 | Grant et al. | 75/0.5 R |
| 4,784,335 | 11/1988 | Haether | 241/20 |
| 4,828,584 | 5/1989 | Cutler | 75/240 |
| 4,910,091 | 3/1990 | Garg et al. | 428/552 |

Primary Examiner—Stephen J. Lechert, Jr.
Assistant Examiner—Leon Nigohosian, Jr.
Attorney, Agent, or Firm—Robert E. Walter

[57] ABSTRACT

A tungsten carbide powder and cemented tungsten carbide article made from the powder are disclosed. The powder has a particle size of greater than 20 micrometers in diameter and no particles less than one-half the average particle size or greater than two and one-half times the average particle size. A process is disclosed for producing the powder which comprises deagglomerating and classifying the tungsten powder to produce a powder wherein the Fisher Subseive Size is greater than 20 micrometers in diameter and wherein essentially no particles are greater than two and one-half times larger than the average Fisher Subsieve Size, forming a first mixture of the tungsten powder and carbon, carburizing, and deagglomerating and classifying the resulting tungsten carbide powder to eliminate particles greater than two and one-half times the average Fisher Subseive Size value and produce a tungsten carbide powder wherein the particle size is greater than 20 micrometers in diameter and wherein there are no particles less than one-half of the average particle size and no particles greater than two and one-half times the average particle size of the tungsten carbide powder. To produce the article a uniform second mixture is formed of the deagglomerated and classified tungsten carbide powder and cobalt powder wherein the cobalt content is about 3% to 20% by weight, a third mixture is formed of the second mixture and a wax binder, a green article is formed from the third mixture, and sintered at about 1380° C. to 1550° C.

1 Claim, 1 Drawing Sheet

UNIFORM COARSE TUNGSTEN CARBIDE POWDER AND CEMENTED TUNGSTEN CARBIDE ARTICLE AND PROCESS FOR PRODUCING SAME

This is a continuation of copending application Ser. No. 07/308,507, filed on Feb. 10, 1989.

This invention relates to a tungsten carbide powder having coarse particles and to a cemented tungsten carbide article having coarse grains and to the process for producing the powder and article which involves close control of the particle size of the starting tungsten powder and of the carburization temperature for producing the tungsten carbide powder.

BACKGROUND OF THE INVENTION

Traditionally coarse grain tungsten carbide powders were produced by mixing a coarse tungsten metal powder with carbon and holding this mix at high temperatures for relatively long periods of time. This process is not only energy intensive and time consuming but would inherently produce particles only partially carburized (having a tungsten core). Upon subsequent milling and/or blending with cobalt (or other binder material) during the production of a carbide grade powder, these partially carburized particles would produce an excessive amount of fine tungsten carbide particles and free tungsten metal. After the sintering of this powder an inhomogeneous microstructure would result. The inhomogeneous microstructure is believed to be detrimental to the consistent performance of the sintered cemented tungsten carbide article which is typically a workpiece.

SUMMARY OF THE INVENTION

In accordance with one aspect of this invention, there is provided a tungsten carbide powder, having an average particle size as measured by Fisher Subseive Size of greater than about 20 micrometers in diameter and wherein there are essentially no particles that are less than about one-half of the average particle size and essentially no particles that are greater than about two and one-half times the average particle size of the tungsten carbide powder.

In accordance with another aspect of the invention, there is provided a tungsten carbide article made from the above described tungsten carbide powder, having a cobalt content of from about 3% to about 20% by weight, wherein the microstructure of the article exhibits essentially no grains that are less than about one-half of the average grain size and essentially no grains that are greater than about two and one-half times the average grain size of the tungsten carbide article.

In accordance with another aspect of the invention, there is provided a process for producing tungsten carbide powder, which comprises deagglomerating tungsten powder and thereafter classifying the tungsten powder to produce a powder wherein the average particle size as measured by Fisher Subseive Size is greater than about 20 micrometers in diameter and wherein essentially no particles are greater than about two and one-half times larger than the average Fisher Subsieve Size, forming a uniform first mixture of the deagglomerated and classified tungsten powder and carbon wherein the amount of carbon is sufficient to react with essentially all of the tungsten to produce tungsten carbide in the subsequent heating step, heating the first mixture at a temperature of from about 1425° C. to about 2000° C. for a sufficient time in a reducing atmosphere to produce tungsten carbide powder, and deagglomerating and thereafter classifying the tungsten carbide powder to eliminate essentially all particles that are greater than about two and one-half times the average Fisher Subseive Size value and to produce a tungsten carbide powder wherein the average particle size is greater than about 20 micrometers in diameter and wherein there are essentially no particles that are less than about one-half of the average particle size and wherein there are essentially no particles that are greater than about two and one-half times the average particle size of the tungsten carbide powder.

In accordance with another aspect of the invention, there is provided a process for forming a cemented carbide article which comprises the additional steps of forming a uniform second mixture of the resulting daeagglomerated and classified tungsten carbide powder and of cobalt powder wherein the cobalt content of the second mixture is from about 3% to about 20% by weight of the second mixture, forming a third mixture of the second mixture and a wax binder, forming a green article from the third mixture, and sintering the green article at a temperature of from about 1380° C. to about 1550° C. for a sufficient time to form a densified article wherein the microstructure of the densified article exhibits essentially no grains that are less than about one-half of the average grain size and which exhibits essentially no grains that are greater than about two and one-half times the average grain size of the cemented tungsten carbide article.

DETAILED DESCRIPTION OF THE INVENTION

Figure 1:
FIG. 1 is a photomicrograph at about 1000× magnification of cemented tungsten carbide produced by prior methods which do not involve close control of the grain size of the starting tungsten powder.

For a better understanding of the present invention, together with other and further objects, advantages and capabilities thereof, reference is made to the following disclosure and appended claims in connection with the above described figures and description of some of the aspects of the invention.

The process of the present invention results in production of relatively uniform coarse particle size tungsten carbide powder in which there is a significant reduction in the amount of fine particles.

The present invention results in production of a cemented tungsten carbide article in which there is a significant reduction of the amount of fine particles. The resultant microstructure of the article is uniformly coarse, improving the physical properties of the cemented tungsten carbide article.

The article produced by the process of the present invention is typically a workpiece such as a mine tool bits.

The process begins with subjecting starting tungsten powder to deagglomeration and classifying to produce a coarse tungsten metal powder having an average particle size as measured by Fisher Subseive Size commonly known in the art as the FSSS measurement, of greater than about 20 micrometers in diameter and being essentially free of particles that are about 2½ times larger than the average FSSS value. The starting tungsten powder is processed such that agglomerated and coarse tungsten particles are eliminated. This is done by deagglomerating the starting tungsten powder such as by milling followed by classifying the powder to remove excessively large particles. The deagglomeration is done typically by dry milling. The classification is done preferably by screening the deagglomerated powder through a 100 mesh screen.

This tungsten powder is mixed with carbon by standard techniques to form a uniform first mixture. The amount of carbon that is added is sufficient to react with essentially all of the tungsten to produce tungsten carbide in the subsequent heating step.

This first mixture is then heated at a temperature of from about 1425° C. to about 2000° C. and preferably from about 1425° C. to about 1650° C. for a sufficient time in a reducing atmosphere preferably hydrogen to produce tungsten carbide powder. This process is called carburization. The carburization temperature is critical to the practice of the present invention. Temperatures outside the above temperature range can result in incomplete carburization or heterogeneous grain formation. The heating time depends on factors such as temperature, size of the charge, nature of the equipment, etc. Because the particle size of the tungsten powder has been controlled so that it is relatively uniform, essentially all of the tungsten reacts and there is essentially no unreacted tungsten.

The tungsten carbide powder is then classified to remove essentially all powder particles that are greater than about two and one half times the average Fisher Subseive Size value, that is to remove particles that are greater than about 50 micrometers in diameter. This is done by deagglomerating the tungsten carbide followed by classifying to achieve a uniform particle size tungsten carbide. The deagglomeration is done by typically by dry milling. The classifying is done preferably by passing the deagglomerated tungsten carbide powder through a 200 mesh screen.

The resulting classified tungsten carbide powder is then mixed with cobalt to form a second mixture in which the cobalt makes up from about 3% to about 20% and most typically from about 6% to about 10% by weight of the second mixture. The mixture can be formed by any blending or milling technique. Attritor milling is the preferred technique. The resulting tungsten carbide-cobalt powder is called grade powder.

The tungsten carbide grade powder is mixed with a suitable wax binder to form a third mixture which is ready-to press powder. The wax binder is typically a paraffin-based or polyethylene glycol-based binder.

A green article is then formed from the third mixture. This is done typically by cold pressing such as by using hydraulic pressing or by isostatic pressing. The green article can have any size and shape.

The green article is then sintered at a temperature of from about 1380° C. to about 1350° C. for a sufficient time to achieve a sintered article of near-full theoretical density. Sintering is done according to known methods. For example, when polyethylene glycol is used as the organic binder, the binder is evacuated in a hydrogen atmosphere and sintering is done under vacuum.

The article has a uniform coarse microstructure when examined under magnification, that is, it exhibits essentially no grains that are less than about ½ the average grain size and exhibits essentially no grains that are greater than about 2½ times the average grain size of the article.

Typically a cemented carbide article made by the process of the present invention in which the cobalt content is about 10% by weight has a coercive force of about 60 gauss-$cm_3$/g and a Rockwell A hardness value of about 87.1.

Figure 2:
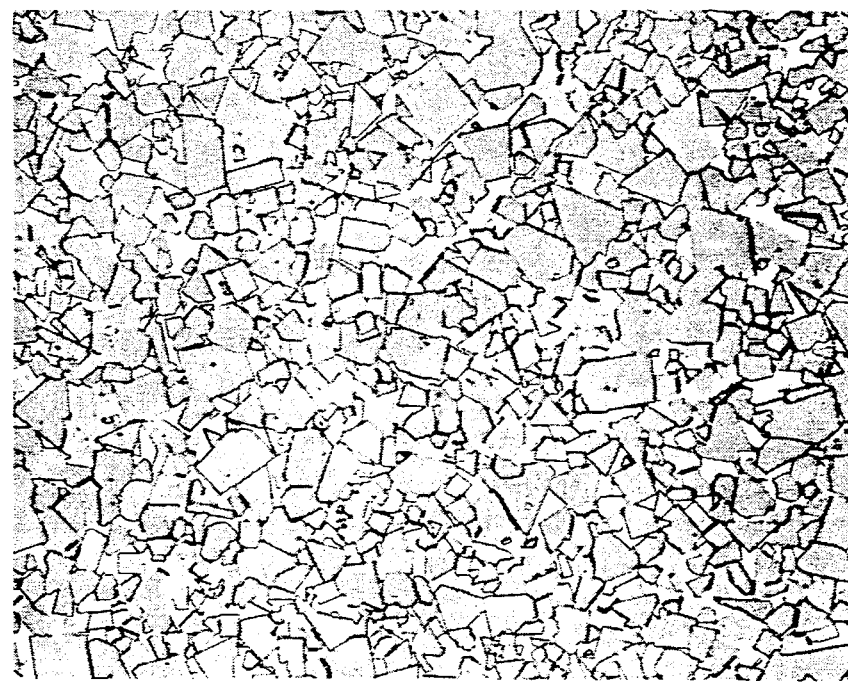
FIG. 2 is a photomicrograph of at about 1000× magnification of the cemented tungsten carbide having the uniform coarse grain size distribution produced by the process of the present invention.

FIG. 1 is a photomicrograph at about 1000× magnification of cemented tungsten carbide produced by prior methods which do not involve close control of the grain size of the starting tungsten powder. The inhomogeneity of the grains can be seen clearly. FIG. 2 is a photomicrograph of at about 1000× magnification of the cemented tungsten carbide having the uniform coarse grain size distribution produced by the process of the present invention. The uniform grain size can readily be seen.

While there has been shown and described what are at present considered the preferred embodiments of the invention, it will be obvious to those skilled in the art that various changes and modifictions may be made therein without departing from the scope of the invention as defined by the appended claims.

What is claimed is:

1. A tungsten carbide article having a cobalt content of from about 6% to about 10% by weight, said article being made from tungsten carbide powder wherein the average particle size as measured by Fisher Subsieve Size is greater than about 20 micrometers in diameter and wherein there are essentially no particles that are less than about one-half of the average particle size and essentially no particles that are greater than about two and one-half times the average particle size of said tungsten carbide powder, and wherein the microstructure of said article exhibits essentially no grains that are less than about one-half of the average grain size and essentially no grains that are greater than about two and one-half times the average grain size of said tungsten carbide article.

* * * * *